United States Patent
Dierschke et al.

(10) Patent No.: US 9,233,875 B2
(45) Date of Patent: Jan. 12, 2016

(54) POLYELECTROLYTIC FLOW AGENT

(75) Inventors: Frank Dierschke, Oppenheim (DE); Michael Schinabeck, Altenmarkt (DE)

(73) Assignee: BASF Construction Solutions GmbH, Trostberg (DE)

( * ) Notice: Subject to any disclaimer, the term of this patent is extended or adjusted under 35 U.S.C. 154(b) by 551 days.

(21) Appl. No.: 13/431,018

(22) Filed: Mar. 27, 2012

(65) Prior Publication Data

US 2012/0255464 A1 Oct. 11, 2012

Related U.S. Application Data

(60) Provisional application No. 61/473,180, filed on Apr. 8, 2011.

(51) Int. Cl.
*C04B 24/24* (2006.01)
*C04B 24/26* (2006.01)
*C04B 28/14* (2006.01)
*C04B 103/30* (2006.01)

(52) U.S. Cl.
CPC ........... *C04B 24/246* (2013.01); *C04B 24/2652* (2013.01); *C04B 28/14* (2013.01); *C04B 2103/30* (2013.01)

(58) Field of Classification Search
USPC ...................................... 106/778, 823; 524/2
See application file for complete search history.

(56) References Cited

U.S. PATENT DOCUMENTS

2006/0281885 A1 12/2006 Bichler et al.
2011/0281975 A1* 11/2011 Kraus et al. ...................... 524/3

FOREIGN PATENT DOCUMENTS

| WO | WO2006/042709 A1 | 4/2006 |
| WO | WO2006/138277 A2 | 12/2006 |
| WO | WO2010/040612 A1 | 9/2009 |
| WO | WO 2010040612 A1 * | 4/2010 |
| WO | WO 2011029711 A1 * | 3/2011 |

* cited by examiner

*Primary Examiner* — Kelechi Egwim
(74) *Attorney, Agent, or Firm* — Norton Rose Fulbright US LLP

(57) ABSTRACT

The invention provides compositions containing a salt formed from an acid and from a base, wherein the acid is defined as a polycondensation product containing (I) at least one structural unit including an aromatic or heteroaromatic and a polyether side chain, and (II) at least one phosphated structural unit including an aromatic or heteroaromatic, and polyethyleneimine as base, wherein the molar mass of the polyethyleneimine is greater than 500 daltons. Likewise provided is a process for producing these compositions and building product mixtures comprising the invention compositions. The invention also provides for the use of the compositions as admixture agents, preferably as flow agents, for aqueous suspensions of binders based on calcium sulphate or for aqueous suspensions of (latently) hydraulic binders.

17 Claims, No Drawings

POLYELECTROLYTIC FLOW AGENT

This application claims the benefit of U.S. Ser. No. 61/473,180 filed Apr. 8, 2011, incorporated herein by reference is its entirety.

The present invention relates to a composition containing a salt formed from an acid and from a base, wherein the acid is defined as a polycondensation product containing (I) at least one structural unit including an aromatic or heteroaromatic and a polyether side chain, and (II) at least one phosphated structural unit including an aromatic or heteroaromatic, and polyethyleneimine as base, wherein the molar mass of the polyethyleneimine is greater than 500 daltons. The invention also relates to a process for producing the compositions and building product mixtures containing the compositions. Likewise concerned are the use of the compositions as admixture agents for aqueous suspensions of binders based on calcium sulphate and the use of the compositions as admixture agents for aqueous suspensions of (latently) hydraulic binders.

It is known that aqueous slurries of pulverulent organic or inorganic substances, such as clays, silicate powder, chalk, carbon black, crushed rock and hydraulic binders are often admixed with admixture agents in the form of dispersants to improve the workability, i.e. kneadability, spreadability, sprayability, pumpability or flowability, of the aqueous slurries. Such admixture agents are capable of breaking up agglomerates formed from solid materials, of dispersing the particles formed and thereby improving the workability. This effect is also utilized in a specific manner in the manufacture of building product mixtures containing hydraulic binders such as cement, lime or calcium sulphate-based binders such as gypsum, hemihydrate and/or anhydrite.

To convert these building product mixtures based on the binders mentioned into a ready-to-use, workable form it is generally necessary to use significantly more mixing water than would be necessary for the subsequent hydration/hardening step. The excess water, which later evaporates, forms voids in the hardened body of building product which lead to significantly worsened mechanical strengths and stabilities.

Admixture agents to reduce this excess proportion of water for a given working consistency and/or improve the workability for a given water/binder ratio are generally referred to as water-reducing or flow agents. These agents are in practice particularly copolymers formed by free-radical copolymerization of acid monomers with polyether macromonomers. These are often also referred to as polycarboxylate ethers (PCEs). In the prior art, such flow agents are described for example in the US2006/281885 patent application. The binder comprises cement, gypsum, lime, anhydrite or some other calcium sulphate-based binder.

WO 2006/138277 A2 patent application utilizes polycarboxylate ethers to fluidize gypsum slurries wherein the efficacy of the flow agents is improved by modifiers selected from cement, lime, carbonates and silicates.

WO 2006/042709 describes polycondensation products based on an aromatic or heteroaromatic compound (A) with 5 to 10 carbon atoms or heteroatoms with at least one oxyethylene or oxypropylene radical and an aldehyde (C) selected from the group formaldehyde, glyoxylic acid and benzaldehyde, or mixtures thereof, which compared with conventionally used polycondensation products engender an improved fluidizing effect of inorganic binder suspensions, including gypsum, and maintain this effect for a prolonged period ("slump retention"). In one particular embodiment, phosphated polycondensation products may also be concerned here, WO2010/040612 patent application likewise discloses phosphated polycondensation products, more particularly a process for their simplified production in a one-pot process, and also the use as admixture agents in a building product mixture. The building product mixture, in addition to hydraulic binders such as cement, may also comprise calcium sulphate-based binders (e.g. gypsum). WO2010/040612 also discloses that agents for reducing the formaldehyde content of the polycondensates such as sodium bisulphite, ethylene urea and also, among others, polyethyleneimine can be used. No examples are given whatsoever of mixtures of polycondensate and polyethyleneimine nor of their possible efficacy as flow agents. Nor is the molar mass of the polyethyleneimine particularized in any way.

Prior art flow agents based on polycarboxylate ethers and prior art flow agents based on phosphated polycondensation products share the problem that it is often necessary to use relatively high doses of flow agent based on the particular binder in order that adequate fluidization may be achieved. There is accordingly a need for a further improvement in flow agent economy. In addition, prior art flow agents can produce an unwelcome retardation of the setting reaction particularly when they are used in large doses and particularly in binder systems based on calcium sulphate.

It is an object of the present invention to achieve increased efficiency, compared with the prior art, more particularly the same fluidizing performance at lower dose and this while avoiding the problem of a retarded setting reaction. The economic aspect of lower costs is also significant, of course.

We have found that this object is achieved by a composition containing a salt formed from an acid and from a base, wherein the acid is defined as a
  polycondensation product containing
    (I) at least one structural unit including an aromatic or heteroaromatic and a polyether side chain, and
    (II) at least one phosphated structural unit including an aromatic or heteroaromatic, and
  polyethyleneimine as base, wherein the molar mass of the polyethyleneimine is greater than 500 daltons, preferably the molar mass of the polyethyleneimine is up to 30 000 daltons.

We found that this object is also achieved by a process for producing the compositions, which process comprises a first process step a) of a reaction mixture containing at least
  (Ia) a monomer including a polyether side chain and an aromatic or heteroaromatic,
  (IIa) at least one phosphated monomer including an aromatic or heteroaromatic, and
  (IIIa) at least one keto compound as monomer of the general structural formula

(IIIa)

with
  $R^7$ is identical or different and represented by H, $CH_3$, COOH or a substituted or unsubstituted aromatic or heteroaromatic compound with 5 to 10 carbon atoms wherein the 5 to 10 carbon atoms are preferably in the aromatic ring system, with $R^8$ is identical or different and represented by H, $CH_3$, COOH or a substituted or unsubstituted aromatic or heteroaromatic compound with 5 to 10 carbon atoms wherein the 5 to 10 carbon atoms are preferably in the aromatic ring system, being reacted under acidic pH conditions, preferably at a pH between 2 and −3, to form the acidic polycondensation product, and is characterized in that, in a second process step b), the acidic polycondensation product thus obtained is mixed with the base polyethyleneimine.

We found that this object is also achieved by building product mixtures containing compositions according to the invention and binders based on calcium sulphate and/or (latently) hydraulic binders. We found that this object is similarly achieved by the use of the compositions as admixture agents, preferably flow agents, for aqueous suspensions of binders based on calcium sulphate and the use of compositions as admixture agents, preferably flow agents for aqueous suspensions of (latently) hydraulic binders.

The compositions of the invention are salts formed from an acid and the base polyethyleneimine wherein the molar mass of the polyethyleneimine is greater than 500 daltons and preferably the molar mass of the polyethyleneimine is up to 30 000 daltons.

The acid used comprises polycondensation products. These contain (I) at least one structural unit including an aromatic or heteroaromatic and a polyether side chain. The aromatics or heteroaromatics typically comprise optionally substituted phenyl structures and/or optionally substituted naphthyl structures. Aromatics are preferable to heteroaromatics and, owing to better solubility in water, aromatics based on phenyl structures are preferable to aromatics based on naphthyl structures. The polyether side chain is typically a polyalkylene oxide and preferably a polyethylene oxide.

Typically, the polycondensate (I) contains at least one structural unit containing an aromatic or heteroaromatic unit with one or more polyether side chains, preferably one or more polyalkylene glycol side chains and more preferably one or more polyethylene glycol side chains. The aromatic or heteroaromatic unit containing one or more polyether side chains and preferably one or more polyalkylene glycol side chains is preferably selected from the group of alkoxylated, preferably ethoxylated hydroxyl-functionalized aromatics or heteroaromatics (for example aromatics selected from phenoxyethanol, phenoxypropanol, 2-alkoxyphenoxyethanols, 4-alkoxyphenoxyethanols, 2-alkylphenoxyethanols, 4-alkylphenoxyethanols) and/or alkoxylated, preferably ethoxylated amino-functionalized aromatics or heteroaromatics (for example the aromatics may be selected from N,N-(dihydroxyethyl)aniline, N-(hydroxyethyl)aniline, N,N-(dihydroxypropyl)aniline, N-(hydroxypropyl)aniline). More preference is given to alkoxylated phenol derivatives (for example phenoxyethanol or phenoxypropanol), and most preference is given to alkoxylated, particularly ethoxylated phenol derivatives having weight average molecular weight $M_w$ between 300 daltons and 10 000 daltons (for example polyethylene glycol monophenyl ether).

Furthermore, the polycondensation products (II) contain at least one phosphated structural unit including an aromatic or heteroaromatic. The acid properties of the polycondensation product are primarily based on the acidity of the phosphate group. The phosphated structural unit including an aromatic or heteroaromatic is preferably selected from the group of alkoxylated, hydroxyl-functionalized aromatics or heteroaromatics (e.g. phenoxyethanol phosphate, polyethylene glycol monophenyl ether phosphates) and/or alkoxylated amino-functionalized aromatics or heteroaromatics (e.g. N,N-(dihydroxyethyl)aniline diphosphate, N,N-(dihydroxyethyl)aniline phosphate, N-(hydroxypropyl)aniline phosphate). The phosphated monomer compounds are obtainable in a known manner by phosphating the corresponding alcohols with, for example, polyphosphoric acid and/or phosphorus pentoxide.

Typically, the polycondensate (II) contains at least one phosphated structural unit comprising an aromatic or heteroaromatic unit. This is preferably selected from the group of alkoxylated hydroxyl-functionalized aromatics or heteroaromatics which include at least one phosphoric ester group (for example phenoxyethanol phosphates, polyethylene glycol monophenyl ether phosphates) and/or alkoxylated amino-functionalized aromatics or heteroaromatics which include at least one phosphoric ester group (for example N,N-(dihydroxyethyl)aniline diphosphate, N,N-(dihydroxyethyl)aniline phosphate, N-(hydroxypropyl)aniline phosphate). More preference is given to alkoxylated phenols with at least one phosphoric ester group, more particularly polyethylene glycol monophenyl ether phosphates.

Frequently, the phosphated polycondensation product of the invention has a weight average molecular weight $M_w$ in the range from 4000 daltons to 150 000 daltons, preferably in the range from 10 000 to 100 000 daltons and more preferably in the range from 15 000 to 75 000 daltons.

The weight average molecular weight $M_w$ is analysed in respect of average molar mass and conversion using size exclusion chromatography (column combinations: OH-Pak SB-G, OH-Pak SB 804 HQ and OH-Pak SB 802.5 HQ from Shodex, Japan; eluant: 80% by volume of aqueous solution of $HCO_2NH_4$ (0.05 mol/l) and 20% by volume of acetonitrile; injection volume 100 µl; flow rate 0.5 ml/min). The calibration to determine the average molar mass was done with linear poly(ethylene oxide) and polyethylene glycol standards.

Further details concerning the production of the polycondensation products are disclosed in the dependent claims and the related description.

Polyethyleneimine having a molar mass greater than 500 daltons plays the part of the base in salt formation. It was found that, surprisingly, a polymeric base having a certain minimum number of ethyleneimine repeat units has particularly good performance characteristics, for example improved dispersing properties. More particularly, compared with a conventionally produced polycondensation product of the prior art, neutralized for example with conventional bases such as alkali or alkaline earth metal hydroxides or similar non-polymeric bases, a higher fluidization is achievable for the same dose. It is likewise surprising that there is no retarding effect in calcium sulphate-based binder systems, more particularly gypsum, and also cementicious binder systems, even though it is known that polyethyleneimine when used as sole admixture to the binder systems based on calcium sulphate and (latently) hydraulic binders causes a retardation of the setting reaction. The surprising effect of the higher dispersibility (effect as flow agent) of the compositions according to the invention is believed to be due to the salt-forming reaction between the acidic polycondensation product and the basic polyethyleneimine giving rise to a polyelectrolyte with a polyanion (from the acidic polycondensation product, especially the phosphated group acting acidic) and polycation (from the base polyethyleneimine). The polyelectrolyte is believed to have a different conformation of the polyether side chains which cooperate with the polyethyleneimine in a synergistic manner to lead to a higher dispersibility. Polycondensation products neutralized with an alkali or alkaline earth metal hydroxide for example, by contrast, are simple polyanions and were found experimentally not to give such a good fluidizing performance.

Surprisingly, an improved dispersing performance was not observed with other polymeric bases such as polyvinylamine or polyvinylformamide, not even when the polyvinylformamide was hydrolysed with the acidic polycondensation product.

The compositions according to the invention are useful as admixture agents, preferably flow agents, for aqueous suspensions of binders based on calcium sulphate. Doses used relative to the calcium sulphate-based binder are preferably in the range from 0.005% by weight to 5.0% by weight, more preferably in the range from 0.01% by weight to 1.0% by weight and even more preferably in the range from 0.025% by weight to 0.5% by weight. The dosing of the compositions of the invention is based on the dry matter of the composition of the invention, based on the sum total of the hydrate stages of calcium sulphate which are present in the calcium sulphate-based binder.

By calcium sulphate-based binder systems in connection with the present invention are meant the various hydrate stages with or else without water of crystallization. What occurs in nature as gypsum rock is calcium sulphate dihydrate, while the naturally occurring calcium sulphate free of water of crystallization is referred to as the anhydrite. In addition to the natural deposits, calcium sulphate is also known as a by-product of certain industrial processes, and then is referred to as synthetic gypsum. Flue gas desulphurization is an example of such industrial processes (FGD gypsum). Synthetic gypsum is also generated in the course of phosphoric and hydrofluoric acid production.

To obtain hemihydrate forms ($CaSO_4$ ½$H_2O$), gypsum ($CaSO_4$ 2$H_2O$) is calcined to eliminate water. Either alpha-hemihydrate or beta-hemihydrate is produced depending on the method of calcination. beta-Hemihydrate is formed on rapid heating in atmospheric apparatus where the water escapes almost explosively and leaves voids behind, alpha-hemihydrate forms when gypsum is dehydrated in sealed autoclaves. The crystal form is then impervious and hence the water requirements of this binder are also distinctly lower than for beta-hemihydrate.

Gypsum hemihydrate rehydrates on addition of water to form dihydrate crystals. The hydration of gypsum typically takes place within a few minutes to a few hours, which is a distinctly shortened working period compared with the hydration of cements, which extends over several hours/days. It is particularly this property which makes gypsum look an attractive alternative to cement as hydraulic agent in many fields of application, since fully cured gypsum products have a pronounced hardness and compressive strength.

Calcium sulphate hemihydrate can form at least two crystal forms: α-calcined gypsum is typically dehydrated in sealed autoclaves. The choice for numerous applications is the so-called β-calcined gypsum, since it is available in sufficient volumes and under economically favourable conditions. However, these advantages can become nullified by the fact that its processing and, more particularly fluidization require comparatively large amounts of water.

The processing of gypsum, but also of hydraulic binders, can be improved by the addition of dispersants in particular, in which case it is particularly the compositions of the present invention which are suitable for this purpose owing to their excellent fluidizing properties.

The compositions according to the invention can be used as admixture agents, preferably flow agents, for aqueous suspensions of (latently) hydraulic binders. By (latently) hydraulic binders are meant not only hydraulic binders such as (Portland) cements, calcium sulphoaluminate cements and/or calcium aluminate cements but also slags, preferably granulated blast furnace slags, fly ash, silica powder, metakaolin, natural pozzolans and/or calcined oil shale. The doses based on the (latently) hydraulic binder or binder mixture are preferably from 0.005% by weight to 5.0% by weight, more preferably from 0.01% by weight to 1.0% by weight and even more preferably from 0.025% by weight to 0.5% by weight. The dosing of the compositions of the invention is based on the dry mass of the compositions of the invention based on the sum total of the (latently) hydraulic binders, more preferably the dosing is based on the amount of cement.

In one preferred embodiment, the structural units (I) and (II) are represented by the following general formulae:

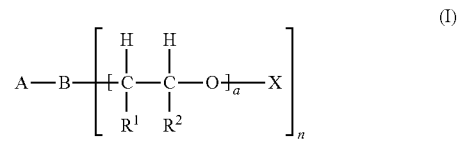

with
A identical or different and also represented by a substituted or unsubstituted aromatic or heteroaromatic compound with 5 to 10 carbon atoms, wherein the 5 to 10 carbon atoms are preferably in the aromatic ring system,
with
B identical or different and also represented by N, NH or O
with
n=2 when B=N and n=1 when B=NH or O
with
$R^1$ and $R^2$ each independently identical or different and also represented by a branched or unbranched $C_1$- to $C_{10}$-alkyl radical, $C_5$- to $C_8$-cycloalkyl radical, aryl radical, heteroaryl radical or H
with
a identical or different and also represented by an integer from 1 to 300, preferably from 5 to 280 and more preferably from 10 to 160,
with X
identical or different and also represented by a branched or unbranched $C_1$- to $C_{10}$-alkyl radical, $C_5$- to $C_8$-cycloalkyl radical, aryl radical, heteroaryl radical or H, preference being given to H,

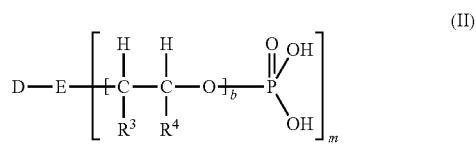

with
D identical or different and also represented by a substituted or unsubstituted aromatic or heteroaromatic compound with 5 to 10 carbon atoms, wherein the 5 to 10 carbon atoms are preferably in the aromatic ring system,
with
E identical or different and also represented by N, NH or O
with
m=2 when E=N and m=1 when E=NH or O
with
$R^3$ and $R^4$ each independently identical or different and also represented by a branched or unbranched $C_1$- to $C_{10}$-alkyl radical, $C_5$- to $C_8$-cycloalkyl radical, aryl radical, heteroaryl radical or H
with b
identical or different and also represented by an integer from 0 to 300, preferably from 1 to 300, more preferably from 1 to 10 and even more preferably 1-5.

The groups A and D in the structural units (I) and (II) of the polycondensation product are usually represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl preferably phenyl, in which case A and D can be chosen independently of each other and each can also consist of a mixture of the compounds mentioned. The groups B and E are preferably each represented independently by O (oxygen).

The radicals $R^1$, $R^2$, $R^3$ and $R^4$ can be selected independently of each other and are preferably represented by H, methyl, ethyl or phenyl, more preferably by H or methyl and even more preferably by H.

Preferably, a in structural unit (I) is an integer from 1 to 300, more preferably from 5 to 280 and even more preferably from 10 to 160, and b in structural unit (II) is an integer from 0 to 300, more preferably from 1 to 10 and even more preferably from 1 to 5. The respective radicals, the length of which is defined by a and b, respectively, can here consist of unitary building blocks, but it can also be advantageous for a mixture of different building blocks to be concerned. Furthermore, the radicals of the structural units (I) and (II) can each independently have the same chain length, in which case a or b is in each case represented by one number. However, it will generally be advantageous for mixtures having different chain lengths to be concerned in each case, and so for the radicals of the structural units in the polycondensation product to have different numerical values for a and independently for b.

Further preferred embodiments are compositions which are characterized in that the acid contains a further structural unit (III) which is represented by the following formula:

(III)

with
Y each independently identical or different and represented by (I), (II), or further constituents of the polycondensation product
with
$R^5$ identical or different and represented by H, $CH_3$, COOH or a substituted or unsubstituted aromatic or heteroaromatic compound with 5 to 10 carbon atoms wherein the 5 to 10 carbon atoms are preferably in the aromatic ring system,
with
$R^6$ identical or different and represented by H, $CH_3$, COOH or a substituted or unsubstituted aromatic or heteroaromatic compound with 5 to 10 carbon atoms wherein the 5 to 10 carbon atoms are preferably in the aromatic ring system.

Preferably, $R^5$ and $R^6$ in structural unit (III) here are each independently identical or different and represented by H, COOH and/or methyl. H is particularly preferred.

Preference is given to compositions characterized in that the molar ratio of the structural units [(I)+(II)]:(III) is 1:0.8 to 3.

Preference is given to compositions characterized in that the molar ratio of the structural units (I):(II) is in the range from 1:10 to 10:1 and more preferably in the range from 1:6 to 1:1.

Preferably, the phosphated polycondensation product according to the invention is present in an aqueous solution containing from 2% to 90% by weight of water and from 98% to 10% by weight of dissolved dry matter, preferably from 40% to 80% by weight of water and from 60% to 20% by weight of dissolved dry matter and more preferably from 45% to 75% by weight of water and from 55 to 25% by weight of dissolved dry matter. The dry matter then consists essentially of the water-free phosphated polycondensation product, but it may advantageously also contain further components such as defoamers and other auxiliaries.

Preference is given to compositions characterized in that the molar mass of the base polyethyleneimine is in the range from 800 to 30 000 daltons and preferably in the range from 1200 to 26 000 daltons. In this molar mass range of the polyethyleneimine, the effects in respect of improved dispersibility are particularly pronounced, as is shown in the examples.

The compositions according to the invention contain a salt formed from the acidic polycondensation product and the base polyethyleneimine wherein the molar mass of the polyethyleneimine is greater than 500 daltons. In addition to the salt mentioned, an excess of polyethyleneimine or an excess of acidic polycondensation product can also be present. The mass ratios of acid and base are thus not particularly restricted. The preferred mass ratio of the acidic polycondensation product to the base polyethyleneimine can also depend on the mineralogical composition of the binder used. It is known that especially water-swellable clays (such as the multilayered clay minerals for example), which may be present in the binder, can lead to an increase in the water requirements of the binder suspension and to a loss of efficacy of dispersing agents. This is especially the case with dispersing agents having polyether side chains. When these water-swellable clays are present at all or present in comparatively high proportions, it has been found to be advantageous to use more polyethyleneimine, since this then disperses the clay particles and/or, by blocking surface sites on the clay particles, prevents the undesired adsorption of the dispersing agent ("polyethyleneimine as sacrificial substance"). The result is an enhanced superplasticization performance.

Preference is given to compositions wherein the mass ratio of the acidic polycondensation product to the base polyethyleneimine is in the range from 1:1 to 1000:1, preferably in the range from 4:1 to 100:1 and more preferably in the range from 7:1 to 20:1. The aforementioned mass ratio will depend greatly on the structure of the acidic polycondensation product in that a high proportion of phosphated structural units in the polycondensation product will make it necessary to use more polyethyleneimine, and vice versa. The preferred ranges concerned are specified above as mass ratio and in an individual case are relatively easy to test, through appropriate experimentation, and if necessary further optimize, for a person skilled in the art. A high proportion of the bases which is accounted for by the polyethyleneimine enables the advantageous reduction in the amount of alkali metals in the dispersing agent. The dispersing agent generally also introduces alkali metals into the building product mixture. It is known that alkali metals can have an adverse effect on the properties of the building product mixture in setting through the formation of virtually water-soluble alkali metal salts and thereby, in the case of gypsum-paper plasterboard panels for example, reduce the adherence of the paper to the gypsum core under moist conditions in particular.

Particular preference is given to compositions whose pH range in aqueous dilute solution at 20° C. at the end of the acid-base reaction between the acidic polycondensation product and the polyethyleneimine of the invention is between 4 and 10 and preferably 6 and 9. The polycondensate which by polymerization in the presence of strong acidic catalysts such as, for example, sulphuric acid, methanesulphonic acid and/or para-toluenesulphonic acid generally has a correspondingly strong acidic pH, typically in the range less than 1, before the acid-base reaction.

Preference is given to compositions characterized in that in addition to the base polyethyleneimine still further bases can be present, in which case the proportion of the bases which is accounted for by the polyethyleneimine is greater than 25% by weight and preferably greater than 50% by weight. Examples of possible further bases are alkali or alkaline earth metal hydroxides and/or alkali or alkaline earth metal carbonates. Sodium hydroxide is particularly preferred. However, conventional bases such as amines for example can also be used. A partial use of bases which are less costly than polyethyleneimine is advantageous for economic reasons particularly. When less than 25% by weight of polyethyleneimine is used, the advantage of the base polyethyleneimine with respect to lower dosing for example will be relatively small.

The invention also provides a process for producing a composition according to one of the preferred embodiments, which process comprises a first process step a) of a reaction mixture containing at least (Ia) a monomer including a polyether side chain and an aromatic or heteroaromatic, (IIa) at least one phosphated monomer including an aromatic or heteroaromatic, and (IIIa) at least one keto compound as monomer of the general structural formula

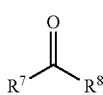

(IIIa)

with

R⁷ identical or different and represented by H, CH₃, COOH or a substituted or unsubstituted aromatic or heteroaromatic compound with 5 to 10 carbon atoms wherein the 5 to 10 carbon atoms are preferably in the aromatic ring system, with R8 is identical or different and represented by H, CH₃, COOH or a substituted or unsubstituted aromatic or heteroaromatic compound with 5 to 10 carbon atoms wherein the 5 to 10 carbon atoms are preferably in the aromatic ring system, being reacted under acidic pH conditions, preferably at a pH between 2 and −3, to form the acidic polycondensation product, and is characterized in that, in a second process step b), the acidic polycondensation product thus obtained is mixed with the base polyethyleneimine.

The monomer which includes a keto group is preferably a monomer selected from the group of ketones, more preferably an aldehyde and even more preferably formaldehyde. Examples of keto compounds according to the general structural formula (IIIa) are formaldehyde, acetaldehyde, acetone, glyoxalic acid and/or benzaldehyde.

In general, the polycondensation is carried out in the presence of an acidic catalyst, by which it is preferable for sulphuric acid, methane sulphonic acid, para-toluenesulphonic acid or mixtures thereof to be concerned here.

The polycondensation is advantageously carried out at a temperature between 20 and 140° C. and a pressure between 1 and 10 bar. A temperature range between 80 and 110° C. will prove advantageous in particular. The reaction time can be between 0.1 and 24 hours, depending on the temperature, the chemical nature of the monomers used and the desired degree of crosslinking. Once the desired degree of crosslinking is reached, which can also be determined for example by the measurement of the viscosity of the reaction mixture, the reaction mixture is cooled down. Details of process step b) were reported in the preceding text description.

The invention also provides building product mixtures containing the compositions of the invention and binders based on calcium sulphate and/or (latently) hydraulic binders. The weight ratios of the compositions of the present invention and the binders correspond in each case to the abovementioned dosages based on the binder (calcium sulphate or (latently) hydraulic binders or binder mixtures). These are thus preferably in the range from 0.005% by weight to 5.0% by weight, more preferably in the range from 0.01% by weight to 1.0% by weight and even more preferably in the range from 0.025% by weight to 0.5% by weight. The dose of the compositions according to the invention is based on the sum total of the dry matter content(s) of the binder(s), and the dose is more preferably based on the sum total of the dry matter content(s) of the calcium sulphate-based binders.

The corresponding building product mixtures are obtainable by incorporating the compositions of the invention, preferably the compositions of the invention in solid form and more preferably in powder form, in the building product. This is generally done together with binder(s), fillers and building product additives such as dispersible powders, water retention aids, thickeners, retarders, accelerators, wetters and other additives customary in building construction chemistry. The binder(s) must here of course be considered to be the essential component of the building product mixture. The binders are described above.

Following the polycondensation of the monomers and the mixing with the polyethyleneimine of the invention, the composition obtained can be converted into the solid/pulverulent state by drying and preferably by spray drying. Preference for producing the building product mixtures is given to a process in which the compositions according to the invention (following the polycondensation of the monomers and the mixing with the polyethyleneimine) are used without prior drying. It is then particularly preferably for a melt having a total water content of less than 10% by weight to be mixed with a carrier material (inorganic carrier materials such as silicates for example) or for the solidified melt to be ground to convert the composition into the pulverulent form. Grinding is a possibility to still further improve the pulverulent properties, particularly the fineness and flowability of the powder.

The invention also provides for the use of the compositions of the invention as admixture agents, preferably flow agent, for aqueous suspensions of binders based on calcium sulphate, in particular for aqueous suspensions of binders based on calcium sulphate for production of gypsum-paper plasterboard and gypsum-only plasterboard panels. Gypsum-paper plasterboard panels are produced from aqueous suspensions of binders based on calcium sulphate on high-speed manufacturing equipment.

Efficient manufacture of gypsum-paper plasterboard panels and also the improvement in properties of gypsum-paper plasterboard panels thus require specific control of the properties of binder suspensions. The use as additive of compositions according to the present invention enables an improvement in workability and also a reduction in mixing water, leading to lower drying requirements and to higher strengths of panels. This enables a reduction in the gypsum content and thus a weight reduction. Gypsum-paper plasterboard panels are typically produced by the calcium sulphate suspension being introduced between two layers of paper and subsequently moulded, the edges of the outside layers of paper becoming joined together. After moulding, the suspension is allowed to hydrate, the panels are cut into desired lengths and excess mixing water is removed in a drying step. The composition claimed can be used according to the present invention together with further additives such as accelerators, retarders, dustproofing agents, surfactants, biocides, fibres for strength enhancement, anti-sag agents to prevent gypsum-paper plasterboard panels from sagging in the cured state, organic binders such as starches and foams, which are typically used to introduce air pores for the purposes of weight reduction.

The invention also provides for the use of the compositions of the invention as admixture agents, preferably flow agents for aqueous suspensions of (latently) hydraulic binders.

EXAMPLES

The following polyethyleneimines of different molecular weight were used: Lupasol® HF (25 000 daltons, ratio of prim./sec./tert. amines 1/1.1/0.7), Lupasol® G100 (5000 daltons, ratio of prim./sec./tert. amines 1/1/0.7), Lupasol® G20 (1300 daltons, ratio of prim./sec./tert. amines 1/0.9/0.6) and Lupasol® FG (800 daltons, ratio of prim./sec./tert. amines 1/0.9/0.5), all available from BASF SE Deutschland.

Inventive Example 1

The condensate is synthesized as per the Comparative Example 1 hereinbelow, except that the neutralizing is done with 210 parts of Lupasol® G100 to a pH of 6.5-7.

Comparative Example 1

A heatable reactor equipped with a stirrer is charged with 400 parts of poly(ethylene oxide) monophenyl ether (average molecular weight 2000 daltons), 48 parts of concentrated methanesulphonic acid, 20.5 parts of water, 87 parts of 2-phenoxyethanol phosphate and 19.6 parts of paraformaldehyde. The reaction mixture is heated to 115° C. for four hours with stirring. It is then allowed to cool down, admixed with 450 parts of water and neutralized to pH 6.5-7 with 104 parts of 50% aqueous sodium hydroxide solution.

Inventive Example 2

The condensate is synthesized as per the following Comparative Example 2a, except that the neutralizing is done with
2a) 224 parts of Lupasol® HF to pH 6.5-7.
2b) 224 parts of Lupasol® HF to pH 6.5-7.
2c) 224 parts of Lupasol® HF to pH
2d) 111 parts of Lupasol® FG to pH 6.5-7.
2e) 55 parts of Lupasol® FG and 55 parts of 50% aqueous sodium oxide solution (1:1 solids) to pH 6.5-7.

Comparative Examples 2 a, b, c

Comparative Example 2a

A heatable reactor equipped with a stirrer is charged with 600 parts of poly(ethylene oxide) monophenyl ether (average molecular weight 5000 daltons), 46 parts of concentrated methanesulphonic acid, 20 parts of water, 105 parts of 2-phenoxyethanol phosphate and 19.9 parts of paraformaldehyde. The reaction mixture is heated to 115° C. for 3.5 hours with stirring. It is then allowed to cool down, admixed with 550 parts of water and neutralized to pH 6.5-7 with 111.4 parts of 50% aqueous sodium hydroxide solution.

Comparative Example 2b

The condensate is synthesized as per Comparative Example 2a, except that the neutralizing is done with 79.6 parts of triethylenetetramine to pH 6.5-7.

Comparative Example 2c

The condensate is synthesized as per Comparative Example 2a, except that the neutralizing is done with 91 parts of triethylenepentamine (>95%) to pH 6.5-7.

Inventive Example 3

The condensate is synthesized as per the following Comparative Example 3, except that the neutralizing is done with 110 parts of Lupasol® FG to pH 6.5-7.

Comparative Example 3

A heatable reactor equipped with a stirrer is charged with 580 parts of poly(ethylene oxide) monophenyl ether (average molecular weight 5000 daltons), 33.5 parts of concentrated sulphuric acid, 14 parts of water, 110 parts of oligoethylene glycol monophenyl ether phosphate (average molecular weight 324 daltons) and 64.1 parts of 30% formaldehyde solution. The reaction mixture is heated to 115° C. for 6 hours with stirring. It is then allowed to cool down, mixed with 650 parts of water and neutralized to pH 6.5-7 with 109.4 parts of 50% aqueous sodium hydroxide solution.

Inventive Example 4

The condensate is synthesized as per Comparative Example 2a, except that the neutralizing is done with Lupasol® G100
4a) to a pH of 3.
4b) to a pH of 5.
4c) to a pH of 9.
4d) to a pH of 11.

Flow Tests with Calcium Sulphate Hemihydrate (Beta)

The required amount of liquid flow agent (as per Synthesis Examples 1 to 3) is weighed into the pot of a Hobart® mixer and the water quantity corresponding to the water-gypsum value in Tables 1 to 6 is added. Then, 400 g of gypsum are added together with the accelerator, steeped for 15 sec and then mixed for 15 sec at 285 rpm (level II).

After 60 sec, the slump is determined with a cylinder (height: 10 cm, diameter: 5 cm). Stiffening time is determined using the blade cut test.

The gypsums each had the following mineralogical composition:
Synthetic Gypsum A:
96.3% of hemihydrate, 0.9% of anhydrite, 0.3% of quartz, 0.5% of muscovite, 2% of other impurities;
Synthetic Gypsum B:
95.6% of hemihydrate, 2.6% of anhydrite, 1.0% of quartz, 0.3% of muscovite, 0.5% of other impurities;
Natural Gypsum C:
86.6% of hemihydrate, 0.9% of anhydrite, 1.5% of calcite, 4.6% of muscovite, 2.6% of chlorite (a four-layer clay mineral), 3.8% of other impurities.

TABLE 1

Fluidizing performance and stiffening time in synthetic gypsum A from a flue gas desulphurizer (beta-hemihydrate)

| Example | Dose [% by weight] | Water-gypsum value | Accelerator [g])* | Slump [cm] | Stiffening time [min:s] |
|---|---|---|---|---|---|
| PCE 239 | 0.180 | 0.53 | 0.120 | 20.2 | 2:15 |
| Comparative Example 1 | 0.190 | 0.53 | 0.105 | 21.0 | 2:05 |
| Inventive Example 1 | 0.150 | 0.53 | 0.105 | 20.3 | 2:15 |
| PCE 239 | 0.080 | 0.63 | 0.100 | 20.2 | 2:10 |
| Comparative Example 1 | 0.070 | 0.63 | 0.100 | 20.6 | 2:15 |
| Inventive Example 1 | 0.060 | 0.63 | 0.100 | 20.8 | 2:15 |
| Comparative Example 3 | 0.230 | 0.53 | 0.09 | 17.5 | 2:10 |
| Inventive Example 3 | 0.185 | 0.53 | 0.08 | 20.0 | 2:15 |

*finely ground CaSO₄ dihydrate corresponding to U.S. Pat. No. 3,573,947

TABLE 2

Fluidizing performance and stiffening time in synthetic gypsum B from a flue gas desulphurizer (beta-hemihydrate)

| Example | Dose [% by weight] | Water-gypsum value | Accelerator [g])* | Slump [cm] | Stiffening time [min:s] |
|---|---|---|---|---|---|
| BNS** | 0.200 | 0.74 | 0.590 | 21.0 | 2:20 |
| Comparative Example 2a | 0.080 | 0.74 | 0.320 | 20.1 | 2:15 |
| Inventive Example 2b | 0.065 | 0.74 | 0.340 | 20.5 | 2:20 |
| Comparative Example 2a | 0.180 | 0.64 | 0.330 | 20.4 | 2:15 |
| Inventive Example 2b | 0.130 | 0.64 | 0.330 | 21.0 | 2:15 |

*finely ground CaSO₄ dihydrate corresponding to U.S. Pat. No. 3,573,947
**β-naphthalenesulphonate (flow agent)

As is apparent from Tables 1 and 2, neutralizing with polyethyleneimine permits a distinct reduction in the dose of the polycondensates for the same slump. In addition the improvement in fluidizing performance is independent of condensate structure, as shown by inventive examples 1 and 3. It is further apparent that neutralizing with polyethyleneimine has no adverse effect on the stiffening time and hence the setting behaviour of the gypsum. It is also evident that the improvement due to the polyethyleneimine is independent of the water-to-gypsum value and of the gypsum composition. The conventional flow agents for gypsum applications PCE 239, a polycarboxylate ether available as Melflux® PCE 239 L/35% N.D. from BASF Construction Chemicals GmbH, and BNS, a naphthalenesulphonate condensate available at Melcret® 600L from BASF Construction Chemicals GmbH, are listed for comparison.

TABLE 3

Liquid fluidizing performance and stiffening time in natural gypsum C (beta-hemihydrate)

| Example | Dose [% by weight] | Water-gypsum value | Accelerator [g])* | Slump [cm] | Stiffening time [min:s] |
|---|---|---|---|---|---|
| Comparative Example 2a | 0.170 | 0.65 | 0.270 | 16.8 | 2:00 |
| Inventive Example 2a | 0.170 | 0.65 | 0.280 | 19.2 | 2:15 |
| Inventive Example 2b | 0.170 | 0.65 | 0.290 | 19.8 | 2:05 |
| Inventive Example 2c | 0.170 | 0.65 | 0.310 | 21.5 | 2:15 |
| Inventive Example 2d | 0.170 | 0.65 | 0.310 | 20.3 | 2:15 |
| Inventive Example 2e | 0.170 | 0.65 | 0.280 | 20.6 | 2:20 |

*finely ground CaSO₄ dihydrate corresponding to U.S. Pat. No. 3,573,947

It is evident from Table 3 that an improved fluidizing performance on the part of the condensates is possible by neutralization with polyethyleneimines of differing molecular weight and/or structure. The performance test of Inventive Example 2e shows moreover that even a "mixed" neutralization with polyethyleneimine and mineral bases leads to an improvement in the dispersing performance of the condensates.

TABLE 4

Fluidizing performance and stiffening time in synthetic gypsum A from a flue gas desulphurizer (beta-hemihydrate)

| Example | Dose [% by weight] | Water-gypsum value | Accelerator [g])* | Slump [cm] | Stiffening time [min:s] |
|---|---|---|---|---|---|
| Comparative Example 2a | 0.160 | 0.53 | 0.125 | 20.4 | 2:10 |
| Inventive Example 2b | 0.140 | 0.53 | 0.100 | 20.8 | 2:20 |
| Comparative Example 2b | 0.180 | 0.53 | 0.130 | 20.3 | 2:20 |
| Comparative Example 2c | 0.185 | 0.53 | 0.130 | 20.3 | 2:15 |

*finely ground CaSO₄ dihydrate corresponding to U.S. Pat. No. 3,573,947

Comparative Examples 2b and 2c in Table 4 illustrate that neutralizing with low molecular weight, oligomeric amines gives a distinctly worse performance as flow agent than the inventive neutralization with polyethyleneimines having a molecular weight greater than 500 daltons. Moreover, somewhat more accelerator is needed to obtain a comparable stiffening time. The counter-ion of the polycondensate should thus be a polymeric structure (or a polycation) to effectuate an increase in the performance of the condensate.

TABLE 5

Fluidizing performance and stiffening time in synthetic gypsum A from a flue gas desulphurizer (beta-hemihydrate)

| Example | Dose [% by weight] | Water-gypsum value | Accelerator [g])* | Slump [cm] | Stiffening time [min:s] |
|---|---|---|---|---|---|
| Comparative Example 2a | 0.185 | 0.57 | 0.060 | 20.4 | 2:20 |
| Inventive Example 4a | 0.210 | 0.57 | 0.080 | 21.0 | 2:05 |
| Inventive Example 4b | 0.185 | 0.57 | 0.070 | 20.4 | 2:10 |
| Inventive Example 2b | 0.170 | 0.57 | 0.075 | 20.8 | 2:20 |
| Inventive Example 4c | 0.160 | 0.57 | 0.080 | 20.2 | 2:15 |
| Inventive Example 4d | 0.250 | 0.57 | 0.110 | 14.7 | 2:25 |

*finely ground CaSO₄ dihydrate corresponding to U.S. Pat. No. 3,573,947

Table 5 lists the fluidizing performance of condensates adjusted to various pH levels with Lupasol® G100. It is evident that maximum improvement in the dispersing effect of condensates is achieved at a neutral to slightly alkaline pH (inventive examples 2b and 4c; pH 6.5 to 7 and pH 9 respectively). When the pH, as in the case of inventive examples 4a and 4b, is lower (pH 3 and pH 5, respectively) or else higher (pH 11 in inventive example 4d), fluidizer performance worsens.

The following tests were carried out by admixing the polycondensate of Comparative Example 2a with Lupasol® FG in the solids ratio of 2:3 (Comparative Example 4a) and in the solids ratio of 5:4 (Comparative Example 4b) following neutralization with NaOH. The results in Table 6 show that the mixture of the polycondensate sodium salt and polyethyleneimine (Comparative Examples 4a and 4b) does not provide any improvement in fluidization. On the contrary, all that is observed is a more severe retardation compared with the product neutralized with aqueous sodium hydroxide solution only (Comparative Example 2a).

TABLE 6

Liquid fluidizing performance and stiffening time in natural gypsum C (beta-hemihydrate)

| Example | Dose of formulation [% by weight] | Water-gypsum value | Accelerator [g] )* | Slump [cm] | Stiffening time [min:s] |
|---|---|---|---|---|---|
| Comparative Example 2a | 0.250 | 0.66 | 0.300 | 20.8 | 2:20 |
| Comparative Example 4a | 0.250 | 0.66 | 0.400 | 24.0 | 5:00 |
| Comparative Example 4b | 0.250 | 0.66 | 0.950 | 20.7 | 2:15 |

*finely ground CaSO₄ dihydrate corresponding to U.S. Pat. No. 3,573,947

The invention claimed is:

1. A composition comprising a salt formed from an acid and from a base,
    wherein the acid is defined as a polycondensation product containing
        (I) at least one structural unit including an aromatic or heteroaromatic and a polyether side chain, and
        (II) at least one phosphated structural unit including an aromatic or heteroaromatic, and
    polyethyleneimine as base,
    wherein the molar mass of the polyethyleneimine is greater than 500 daltons,
    wherein the mass ratio of the acidic polycondensation product to the base polyethyleneimine is in the range from 4:1 to 100:1.

2. The composition according to claim 1, wherein the structural units (I) and (II) are represented by the following formulae:

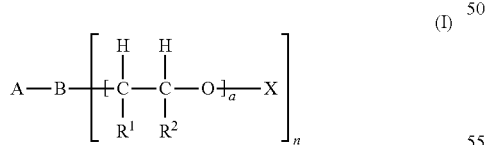

wherein
A is identical or different and is also represented by a substituted or unsubstituted aromatic or heteroaromatic compound with 5 to 10 carbon atoms, wherein the 5 to 10 carbon atoms are preferably in the aromatic ring system,
with
B is identical or different and also represented by N, NH or O
wherein
n is 2 when B is N and wherein n is 1 when B is NH or O; wherein $R^1$ and $R^2$ each independently identical or different and also represented by a branched or unbranched $C_1$- to $C_{10}$-alkyl radical, $C_5$- to $C_8$-cycloalkyl radical, aryl radical, heteroaryl radical or H
wherein a is identical or different and also represented by an integer from 1 to 300,
    wherein X is identical or different and also represented by a branched or unbranched $C_1$- to $C_{10}$-alkyl radical, $C_5$- to $C_8$-cycloalkyl radical, aryl radical, heteroaryl radical or H; and

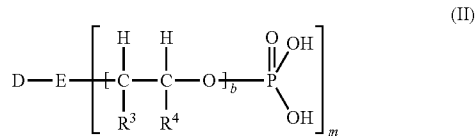

wherein D identical or different and also represented by a substituted or unsubstituted aromatic or heteroaromatic compound with 5 to 10 carbon atoms, wherein the 5 to 10 carbon atoms are preferably in the aromatic ring system,
wherein E is identical or different and also represented by N, NH or O;
wherein m is 2 when E is N and wherein m is 1 when E is NH or 0;
wherein $R^3$ and $R^4$ each independently identical or different and also represented by a branched or unbranched $C_1$- to $C_{10}$-alkyl radical, $C_5$- to $C_8$-cycloalkyl radical, aryl radical, heteroaryl radical or H
wherein b is identical or different and also represented by an integer from 0 to 300.

3. A composition according to claim 1, wherein the acid contains a further structural unit (III) which is represented by the following formula:

wherein Y are each independently identical or different and represented by (I), (II), or further constituents of the polycondensation product
wherein $R^5$ identical or different and represented by H, $CH_3$, COOH or a substituted or unsubstituted aromatic or heteroaromatic compound with 5 to 10 carbon atoms wherein the 5 to 10 carbon atoms are preferably in the aromatic ring system,
and wherein $R^6$ identical or different and represented by H, $CH_3$, COOH or a substituted or unsubstituted aromatic or heteroaromatic compound with 5 to 10 carbon atoms wherein the 5 to 10 carbon atoms are preferably in the aromatic ring system.

4. A composition according to claim 3, wherein $R^5$ and $R^6$ in structural unit (III) are each independently represented, identically or differently, by a member selected from the group consisting of H, COOH and methyl.

5. A composition according to claim 1, wherein the molar ratio of structural units [(I)+(II)]:(III) is 1:0.8 to 3.

6. A composition according to claim 1, wherein the molar ratio of structural units (I):(II) is in the range from 1:10 to 10:1.

7. A composition according to claim 1, wherein the composition contains 2% to 90% by weight of water and 98% to 10% by weight of dissolved dry matter.

8. A composition according to claim 1, wherein the molar mass of the base polyethyleneimine is in the range of from 800 to 30,000 g/mol.

9. A composition according to claim 1, wherein the mass ratio of the acid polycondensation product to the base polyethyleneimine is in the range from 7:1 to 20:1.

10. A composition according to claim 1, further comprising further bases.

11. A composition according of claim 10, wherein the composition comprises greater than 25% by weight polyethyleneimine.

12. A process for producing a composition according to claim 1, which process comprises the steps of:
 a) reacting under acidic pH a reaction mixture comprising
  (Ia) a monomer including a polyether side chain and an aromatic or heteroaromatic,
  (IIa) at least one phosphated monomer including an aromatic or heteroaromatic, and
  (IIIa) at least one keto compound as monomer of the formula

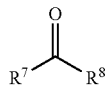
(IIIa)

wherein $R^7$ is identical or different and represented by H, $CH_3$, COOH or a substituted or unsubstituted aromatic or heteroaromatic compound with 5 to 10 carbon atoms wherein the 5 to 10 carbon atoms are preferably in the aromatic ring system, with $R^8$ is identical or different and represented by H, $CH_3$, COOH or a substituted or unsubstituted aromatic or heteroaromatic compound with 5 to 10 carbon atoms wherein the 5 to 10 carbon atoms are preferably in the aromatic ring system, to form the acidic polycondensation product, and
 b) mixing the acidic polycondensation product with the base polyethyleneimine.

13. A building product mixture containing compositions according to claim 1 and a binder based on calcium sulphate or a hydraulic binder.

14. A method of regulating the flow of an aqueous suspension of a binder based on calcium sulphate comprising adding to the aqueous suspension of sufficient amount of the composition of claim 1 to control the flow of said aqueous suspension.

15. A composition comprising a hydraulic binder and the composition of claim 1.

16. A composition according to claim 1, wherein the molar mass of the base polyethyleneimine is in the range of from 1,200 to 26,000 g/mol.

17. A composition according to claim 9, wherein the mass ratio of the acidic polycondensation product to the base polyethyleneimine is in the range from 4:1 to 20:1.

* * * * *